June 18, 1957       R. A. McCALLUM       2,795,933
HYDRAULIC CIRCUIT FOR CUTOFF DEVICE OR THE LIKE
Filed Jan. 12, 1953
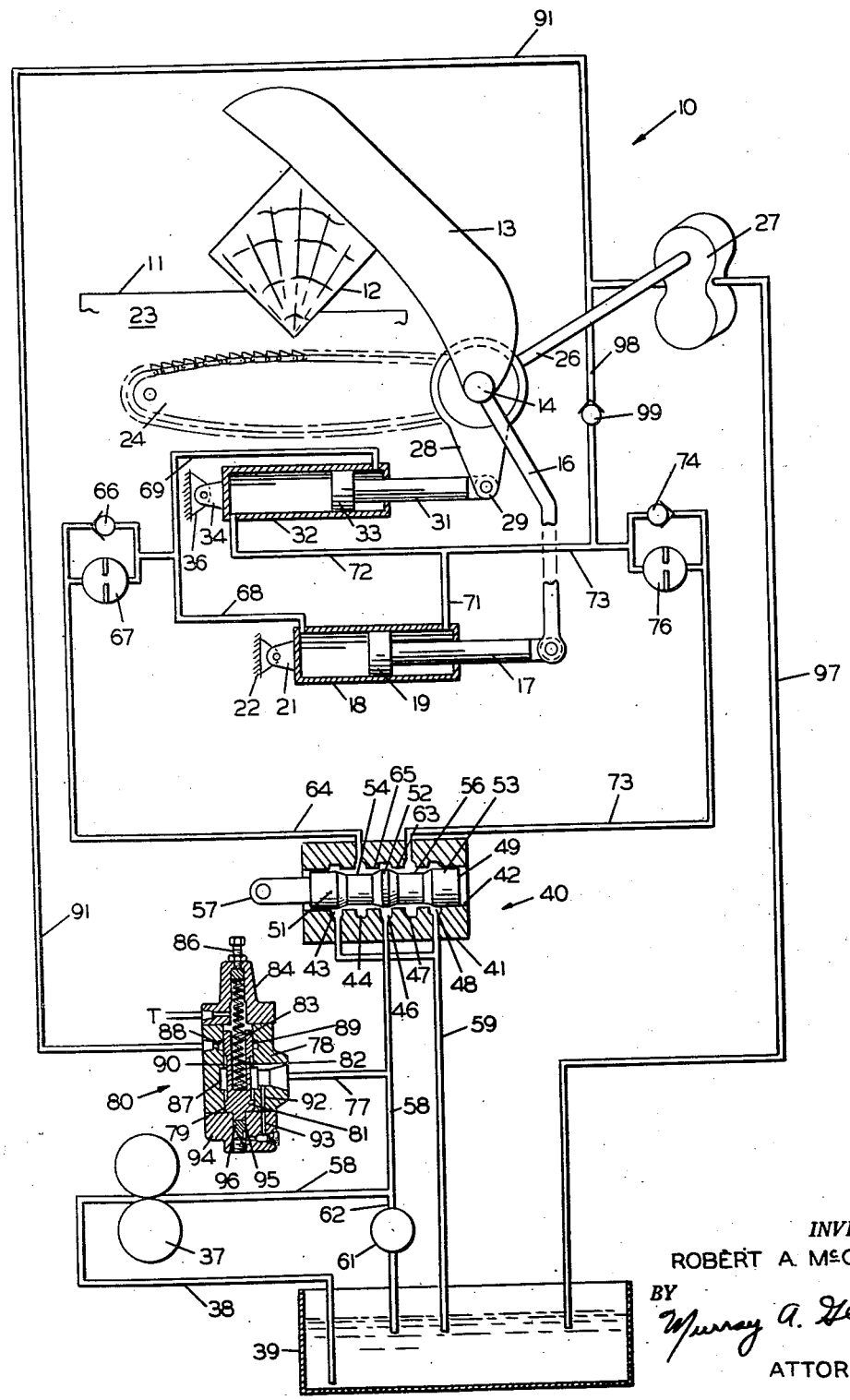
INVENTOR.
ROBERT A. McCALLUM
BY
ATTORNEY

United States Patent Office 2,795,933
Patented June 18, 1957

2,795,933

HYDRAULIC CIRCUIT FOR CUTOFF DEVICE OR THE LIKE

Robert A. McCallum, Clarendon Hills, Ill., assignor to Goodman Manufacturing Company, Chicago, Ill., a corporation of Illinois Application January 12, 1953, Serial No. 330,733

5 Claims. (Cl. 60—97)

This invention relates to machines for cutting timbers or the like to desired length.

In machines for sawing timbers to desired length it is desirable to position the guard or clamp in position engaging the timber prior to feed movement of the saw or cutter, both of such movements taking place before start of the saw motor.

According to the present invention such first two operations take place in desired sequence by actuation of a pair of fluid operated piston type motors so connected that the differential forces across the pistons are opposite in sense and different in magnitude, both of such operations taking place prior to operation of the saw motor which is controlled by a sequence valve controlling the supply of pressure fluid thereto.

A simple control valve is connected in a hydraulic circuit to such motors, and is so arranged that the reverse set of operations can take place, thereby insuring that the saw is never in a position to injure the operator.

It is a principal object of the invention to provide an improved sawing machine characterized by a simple fluid pressure control circuit therefor.

Other objects and important features of the invention will be apparent from a study of the following specification taken with the drawing which together show a preferred embodiment of the invention and what is now considered to be the best mode of practicing the principles thereof. The scope of the invention, however, is not intended to be limited by the embodiment herein shown, others being capable of being suggested by the teachings herein. The invention, therefore, is intended to be limited only by the terms of the appended claims.

The drawing shows schematically an improved sawing machine according to the present invention.

Referring now to the drawing, the improved sawing machine according to the present invention is referred to generally by the reference numeral 10 and includes a bench 11 on which is disposed a timber 12 to be sawed to proper length. A saw guard 13 holds the timber 12 in position and rotates about a shaft 14. The saw guard 13 is rigidly attached to an arm 16 which is hingedly connected to a piston rod 17 of an actuating cylinder 18 having a piston 19 movable with the piston rod 17 therein. The actuating cylinder 18 has a mounting ear 21 for hingedly connecting the cylinder 18 to an abutment 22 so that the cylinder may pivot freely during its actuating movement.

The bench 12 has a slot 23 therein so that a chain type saw 24 may move up and down within the slot 23 to cut the timber 12 disposed over the slot 23. The chain type saw 24 includes a drive shaft 26 which is turned by a fluid operated motor 27. The saw 24 rocks with an arm 28 which is hingedly connected at 29 to a piston rod 31 of an actuating cylinder 32 having a piston 33 slideable therein and fixed to the piston rod 31. The cylinder head end of the cylinder 32 has a mounting ear 34 which is pivotally connected to a fixed abutment 36, so that the cylinder 33 may pivot with respect to the abutment 36 upon pivoting movement of the chain saw 24.

The precise details of the saw clamp 13 and the chain saw 24 form no part of the present invention, and it is contemplated that a saw clamp of other configuration may be employed as well, and that a circular type of saw mounted at the end of a swinging arm be substituted for the chain type saw shown.

Motive fluid for actuating cylinders 18 and 32, and for driving the saw motor 27, is supplied by a pump 37 which receives fluid by a line 38 from a tank 39. The control of the cylinders 18 and 32 is achieved by a control valve referred generally by the reference numeral 40. Said control valve comprises a valve block 41 having a cylindrical bore 42 therein which is intersected by spaced ports 43, 44, 46, 47 and 48. A valve plunger 49 is shiftable within the bore 42 and includes spaced lands 51, 52 and 53 which alternate with portions of reduced diameter 54 and 56. The valve plunger 49 has an operating stem 57 which may be connected to any convenient operating handle.

The valve 40 is of the substantially no back pressure type when in a neutral position, as shown, and is arranged to spill pressure-fluid from a pressure line 58 and entering the valve block 41 by the pressure port 46 around the land 52 past the reduced diameter portions 54 and 56 and out the exhaust ports 43 and 48, so that the fluid will return to the tank 39 by means of an exhaust line 59. A pressure relief valve 61 is placed in a line 62 branching from the pressure line 58 to limit the pressure supplied by the pump 37 to the valve 40.

The valve plunger 49 is operable to a position where the land 52 laps a land 63 between the ports 46 and 47, at which time the land 51 laps the tank port 43. Under such conditions pressure fluid will be directed into a pressure line 64 connected to the operating port 44 to move past a check valve 66 connected in parallel with a pressure throttling orifice 67, substantially all of the pressure fluid moving past the check valve 66.

Pressure lines 68 and 69 branch from the pressure line 64 and are connected respectively to the cylinder head end of the actuating cylinder 18 and to the piston rod end of the actuating cylinder 32. A line 71 is connected to the piston rod end of the cylinder 18, and a line 72 is connected to the cylinder head end of the actuating cylinder 32. Said lines connect with a line 73 having connected in parallel therein a check valve 74 and a throttling orifice 76, said line being further connected to working port 47 of the valve body 41, which in the aforesaid position of the valve plunger 49 in connected past the reduced diameter 56 of the valve plunger 49 to the tank port 48 and the tank return line 59.

Consider the condition obtaining upon movement of the plunger 49 to the aforesaid position thereof. Under said condition pressure fluid will be directed to the cylinder head end of the cylinder 18 against the piston 19. Pressure fluid will also be directed against the piston rod end of the piston 33 of the cylinder 32. Since the opposite sides of the respective pistons 19 and 33 will be connected to tank by means of the line 73, a differential force will obtain across the pistons 19 and 33. For purposes of explanation herein the area of each piston on the cylinder head side thereof may be considered as having twice the effective area of the piston rod end thereof.

The admission of pressure fluid to the aforesaid cylinders 18 and 32 will thus create a differential force across the respective pistons therein, which differential force is a function of the throttling effect caused by the throttling orifice 76 disposed in the line 73. It will be seen then that the effective differential force across the piston 19 will be twice that of the effective differential force across the piston 33, since the effective working area of the piston 19 is twice that of the effective working area on the piston 33. It may be assumed that the load moved by each piston is the same in each case, and the difference between the total forces obtaining across the pistons 19 and 33 will cause them to operate sequentially, piston rod 17 thus rocking the clamp 13 into position against the timber 12 prior to the rocking of the chain saw 24 about the shaft 14 by the piston rod 31.

When the piston rod 17 and 31 have reached their limit of travel as determined by the clamping of the timber 12 and the engagement of the chain saw 24 with the timber 12, a back pressure will be created in the lines 64 and 58. Said back pressure will be manifested in a pressure line 77 branching from the pressure line 58 to cause actuation of a sequence valve indicated generally by the reference numeral 80.

Said sequence valve includes a valve body 78 having a bore 79 therein. A valve plunger 81 is slideable within the bore 79 and is opposed by a spring 82 supported within a bore 83 within the valve plunger 81 and bottomed against an end cap 84 secured to the valve body 78 in any convenient manner. An adjusting screw 86 is threaded into the end cap 84 and is arranged to adjust the tension upon the spring 82.

The bore 79 is intersected by spaced ports 87 and 88, port 88 being normally lapped by a land 89 on the valve member 81 which has a portion of reduced diameter 90. Port 88 is connected by a line 91 to supply pressure fluid, under conditions to be described, to the saw motor 27. The port 87 is intersected by a pressure passageway 92 which is in alignment with a pressure passageway 93 in an opposite end cap 94 secured to the valve body 78 in any convenient manner. The end cap 94 is provided with a pilot bore 95 for a pilot piston 96 which bears against the piston 81 within the bore 79 of the valve body 78. When the pressure in the line 77 reaches a critical value, the pilot piston 96 will move the valve plunger 81 to a position unlapping the port 88 causing fluid to pass around the reduced diameter portion 90 to the saw motor 27 to turn the same, spent fluid from the motor 27 being returned to the tank 39 by way of a return line 97.

A line 98 branches from the supply line 91 to the saw motor 27 and is connected in the line 73 between the actuating cylinders 18 and 32 and the check valve 74 and the metering orifice 76. A check valve 99 is connected in the line 98 and serves to maintain the pressure in the line 73 at a value substantially corresponding to that in line 91 excepting for the pressure drop caused by the bleeding of pressure fluid at the throttling orifice 76. It will be remembered that a certain amount of pressure drop occurs at sequence valve 80, since there is flow therethrough, so that the pressure in line 91 is less than in line 64 now in a static instead of a kinetic condition.

The establishing of such greater pressure in the line 73 by the supply of pressure fluid to the saw motor 27 causes a smaller differential force to be maintained across the piston 33 of the saw-feed actuating cylinder 32, so that only a suitable differential force will be had sufficient to maintain proper feeding action of the saw feed motor 32, thereby preventing stalling of the saw motor 27.

Obviously, when the saw motor 27 is operating close to a condition of stalling thereof the pressure maintained in the line 73 will of course be greater than the pressure obtained when the saw is operating properly. Such increase of pressure will cause the differential force across the piston 33 to be reduced in value, thereby lessening the feeding force against the chain saw 24. Conversely, when the saw motor 27 is operating at proper speed the pressure in the line 73 will drop thereby causing the greater effective differential force across the piston 33, and thereby augmenting the feed movement thereof.

Consider now the situation obtaining when it is desired to raise the saw clamp 13 at the conclusion of a sawing operation. Under such conditions the valve plunger 49 will be actuated to a position where the land 52 is in alignment with the land 65 between the ports 44 and 46 of the valve block 41. Under this initial movement of the valve plunger 49 pressure will no longer be effective in the line 77 to operate the sequence valve 80, and the land 89 of the plunger 81 thereof will once more lap the port 88 thereby cutting off the supply of pressure fluid to the saw motor 27.

The pressure obtaining in the line 58 will be manifested in the port 47 and the line 73, the pressure fluid being directed past the check valve 74 and into the line 73. Such pressure, of course, will be blocked by the check valve 99, so that fluid cannot be supplied to the saw motor 27. The pressure within the line 73 will also be manifested against the piston rod end of the actuating cylinder 18 and the cylinder head end of the actuating cylinder 32. The flow of fluid from the opposite ends of said cylinders will be restricted, of course, by the throttling orifice 67, so that the return of fluid by way of the line 64 and the line 59 to tank will be maintained at a desired rate. The building up of pressure caused by the throttling restriction 67 will cause a greater differential force to obtain across the piston 33 than across the piston 19, thereby causing the saw 24 to be retracted ahead of the saw clamp 13. With the valve plunger 49 maintained in the aforesaid second condition thereof the saw guard 13 will be maintained in its lifted position and the chain saw 24 in its retracted position.

From the foregoing description it will be apparent that there has been provided a novel and useful arrangement whereby the operation of placing a saw guard in desired position and whereby feed movement of the saw will be had in desired sequence prior to the operation of the saw motor. It will be apparent that the saw guard is always in position prior to both the feed movement and the operation of the saw, thereby insuring that the operator thereof will not be exposed to needless danger. The desired sequence of operation takes place upon a single movement of the control valve, and the reverse sequence of operation takes place by a single movement of the valve in an opposite direction, all such desired movements taking place automatically and without further attention of the operator. By the provision of the simple sequence valve connected in the pressure line assurance is always had that the saw motor will not commence operation until after the saw guard is in position and after the saw is in position for sawing operations.

While the invention has been described in terms of a preferred embodiment thereof it is not intended that the invention be limited by the precise embodiments herein shown, other embodiments being especially reserved as they may fall within the scope and purview of the claims here appended.

I claim:

1. In a control system including a source of motive fluid under pressure, a first actuating means including a first cylinder and first piston movable relative to one another, a fluid operated motor, a fluid operated device driven by said fluid operated motor, a second actuating means including a second cylinder and second piston movable relative to one another for moving said fluid operated device, each of said pistons having oppositely disposed differential working areas within its respective cylinder, a pressure line connecting said source with said first and second actuating means, a control valve in said pressure line effectively connecting one end of each of said cylinders to said source and the other end of each of said cylinders to an exhaust line, throttling means in said exhaust line to regulate the application of a differential force across the pistons, said pressure line having a connection to one end of one cylinder and to the opposite end of the other cylinder to thereby provide a greater differential force across the first piston than across the second piston for operating said first actuating means before said second actuating means, and a valve responsive to the back pressure from said actuating means for causing pressure fluid to be directed to said fluid operated motor after the aforesaid operation of said actuating means.

2. A control system as defined in claim 1 characterized by a conduit from the fluid operated motor at the pressure input side thereof and between said throttling means and both of said actuating means for reducing the differential force across the piston of said second named actuating means to prevent stalling of said fluid operated motor driving said fluid operated device.

3. A control system as defined in claim 1 wherein said control valve is actuated to a second position to cause the aforementioned exhaust line to direct pressure fluid in an opposite direction to both of said actuating means, and wherein said first mentioned pressure line is provided with throttling means connected between said control valve and both of said actuating means at the opposite ends thereof to cause said second named actuating means to move in a retractile direction before said first named actuating means.

4. A control system as defined in claim 3 wherein both of said throttling means are connected in parallel with valve means providing bypass of pressure fluid around one of said throttling means when fluid under pressure is directed to said actuating means.

5. A control system as defined in claim 2 wherein a check valve is provided in the line connecting the pressure input side of said fluid operated motor with said actuating means to prevent operation of said fluid operated motor when said actuating means are being operated in a reverse direction.

References Cited in the file of this patent

UNITED STATES PATENTS

| | | |
|---|---|---|
| 1,994,974 | Wiedmann | Mar. 19, 1935 |
| 2,024,254 | Romaine et al. | Dec. 17, 1935 |
| 2,301,028 | Esch | Nov. 3, 1942 |
| 2,368,138 | Hayden | Jan. 30, 1945 |
| 2,598,233 | Deardorff | May 27, 1952 |
| 2,665,555 | Martinsson | Jan. 12, 1954 |
| 2,699,649 | Messick | Jan. 18, 1955 |